(12) United States Patent
Taoka et al.

(10) Patent No.: US 9,398,590 B2
(45) Date of Patent: Jul. 19, 2016

(54) MOBILE TERMINAL DEVICE AND RADIO BASE STATION APPARATUS

(75) Inventors: Hidekazu Taoka, Tokyo (JP); Yuichi Kakishima, Tokyo (JP); Katsutoshi Kusume, Tokyo (JP); Guido Dietl, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 221 days.

(21) Appl. No.: 13/643,566

(22) PCT Filed: Apr. 28, 2011

(86) PCT No.: PCT/JP2011/060375
§ 371 (c)(1),
(2), (4) Date: Jan. 4, 2013

(87) PCT Pub. No.: WO2011/136331
PCT Pub. Date: Nov. 3, 2011

(65) Prior Publication Data
US 2013/0195035 A1    Aug. 1, 2013

(30) Foreign Application Priority Data

Apr. 30, 2010   (JP) .................................. 2010-104838

(51) Int. Cl.
*H04L 5/14*   (2006.01)
*H04B 7/00*   (2006.01)
(Continued)

(52) U.S. Cl.
CPC ......... *H04W 72/0466* (2013.01); *H04B 7/0478* (2013.01); *H04B 7/065* (2013.01); *H04L 25/03898* (2013.01); *H04L 25/03949* (2013.01); *H04B 7/0452* (2013.01); *H04B 7/0456* (2013.01); *H04B 7/0482* (2013.01); *H04B 7/063* (2013.01); *H04B 7/0639* (2013.01); *H04L 5/0007* (2013.01); *H04L 25/0204* (2013.01); *H04L 25/03942* (2013.01)

(58) Field of Classification Search
CPC .. H04B 7/0456; H04B 7/0478; H04B 7/0482; H04B 7/0669; H04L 1/0618
USPC .................................................. 370/328, 329
See application file for complete search history.

(56) References Cited

U.S. PATENT DOCUMENTS 6,182,030 B1 *  1/2001  Hagen et al. ................... 704/201
7,912,133 B2 *  3/2011  Cheon ................... H04L 1/0031
                                                   370/384
(Continued)

OTHER PUBLICATIONS

3GPP TSG RAN WG1 Meeting #60bis, Beijing, China, Apr. 12-16, 2010.*

(Continued)

*Primary Examiner* — Brian Roberts
*Assistant Examiner* — Abu-Sayeed Haque
(74) *Attorney, Agent, or Firm* — Osha Liang LLP

(57) ABSTRACT

Disclosed is a mobile terminal device and a radio base station apparatus capable of effectively feeding back PMIs by selecting a precoder using double codebooks W1 and W2 in downlink MIMO transmission. The mobile terminal device includes a feedback control signal generating section that individually performs channel coding for the first PMI selected from the first codebook for wideband/long-period and the second PMI selected from the second codebook for subband/short-period and a transmit section that transmits the individually channel-coded first and second PMIs to the radio base station apparatus on a physical uplink shared channel (PUSCH).

8 Claims, 11 Drawing Sheets

(51) Int. Cl.
  *H04J 4/00* (2006.01)
  *H04L 12/28* (2006.01)
  *H04J 3/00* (2006.01)
  *H04W 72/04* (2009.01)
  *H04L 25/03* (2006.01)
  *H04B 7/04* (2006.01)
  *H04B 7/06* (2006.01)
  *H04L 5/00* (2006.01)
  *H04L 25/02* (2006.01)

(56) References Cited

U.S. PATENT DOCUMENTS

| | | | | |
|---|---|---|---|---|
| 8,537,924 B2* | 9/2013 | Jongren et al. | | 375/267 |
| 2009/0262854 A1* | 10/2009 | Lee et al. | | 375/267 |
| 2009/0274225 A1* | 11/2009 | Khojastepour | H04B 7/0639 | 375/260 |
| 2010/0157924 A1* | 6/2010 | Prasad et al. | | 370/329 |
| 2010/0195615 A1* | 8/2010 | Lee | H04J 11/0026 | 370/330 |
| 2010/0238984 A1* | 9/2010 | Sayana | H04B 7/0634 | 375/219 |
| 2010/0254474 A1* | 10/2010 | Gomadam | H04B 7/0417 | 375/267 |
| 2010/0310000 A1* | 12/2010 | Ko et al. | | 375/260 |
| 2010/0313098 A1* | 12/2010 | Lee | H03M 13/2707 | 714/752 |
| 2011/0080903 A1* | 4/2011 | Yin | H04L 1/0067 | 370/345 |
| 2011/0151884 A1* | 6/2011 | Zhao | | 455/452.1 |
| 2011/0176629 A1* | 7/2011 | Bayesteh | H04B 7/0417 | 375/267 |

OTHER PUBLICATIONS

3GPP TSG RAN WG1 Meeting #60bis Beijing, China, Apr. 12-16, 2010, R1-102302.*

NTT DOCOMO, "CSI Feedback Enhancement for LTE-Advanced," 3GPP TSG RAN WG1 Meeting #60bis; R1-102302; Beijing, China; Apr. 12-16, 2010 (3 pages).

3GPP TR 25.913 V8.0.0, "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

International Search Report issued in PCT/JP2011/060375, mailed on Aug. 9, 2011 (5 pages).

Decision to Grant a Patent in corresponding Japanese application No. 2010-104838 dated May 7, 2013 (4 pages).

Office Action for Japanese Patent Application No. 2010-104838, mailing date Feb. 19, 2013, with English translation thereof (7 pages).

* cited by examiner

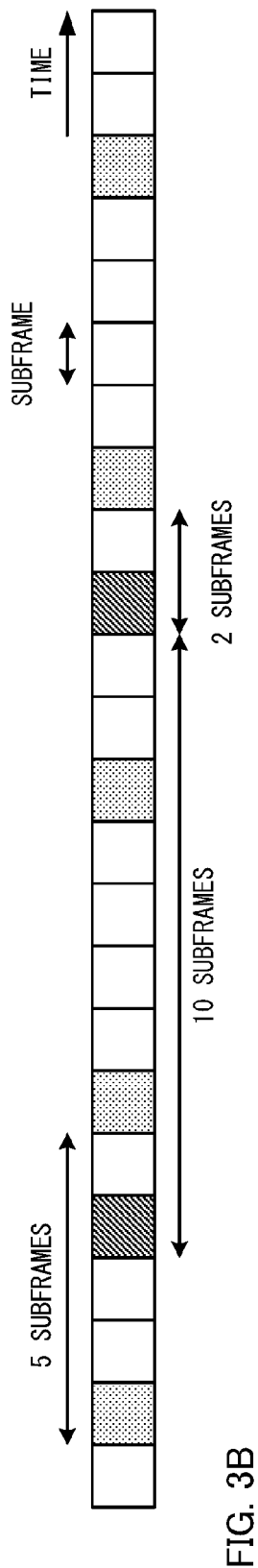
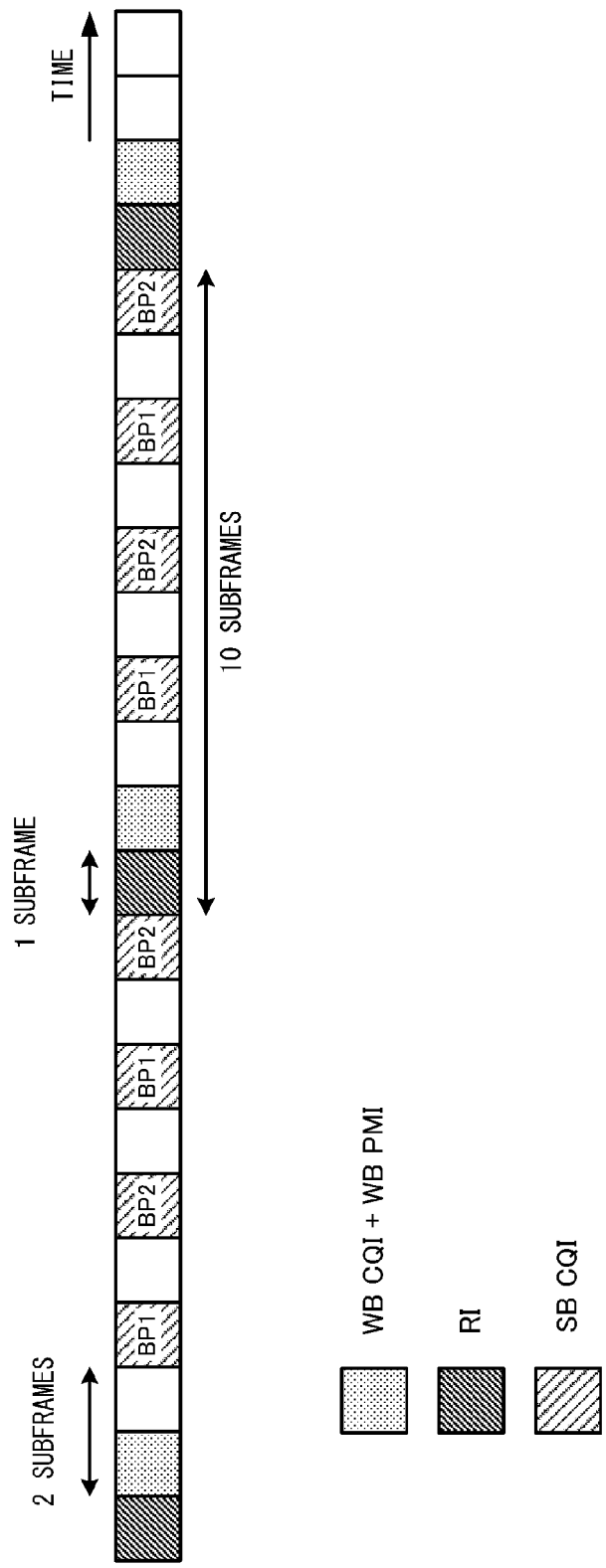
FIG. 3A
FIG. 3B

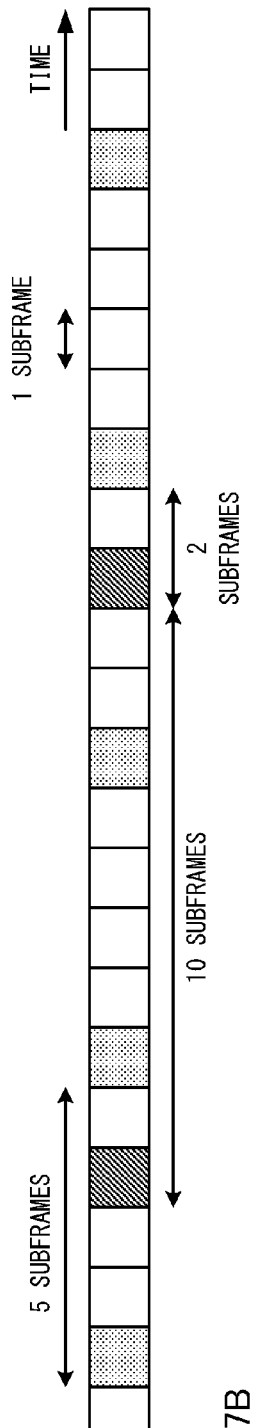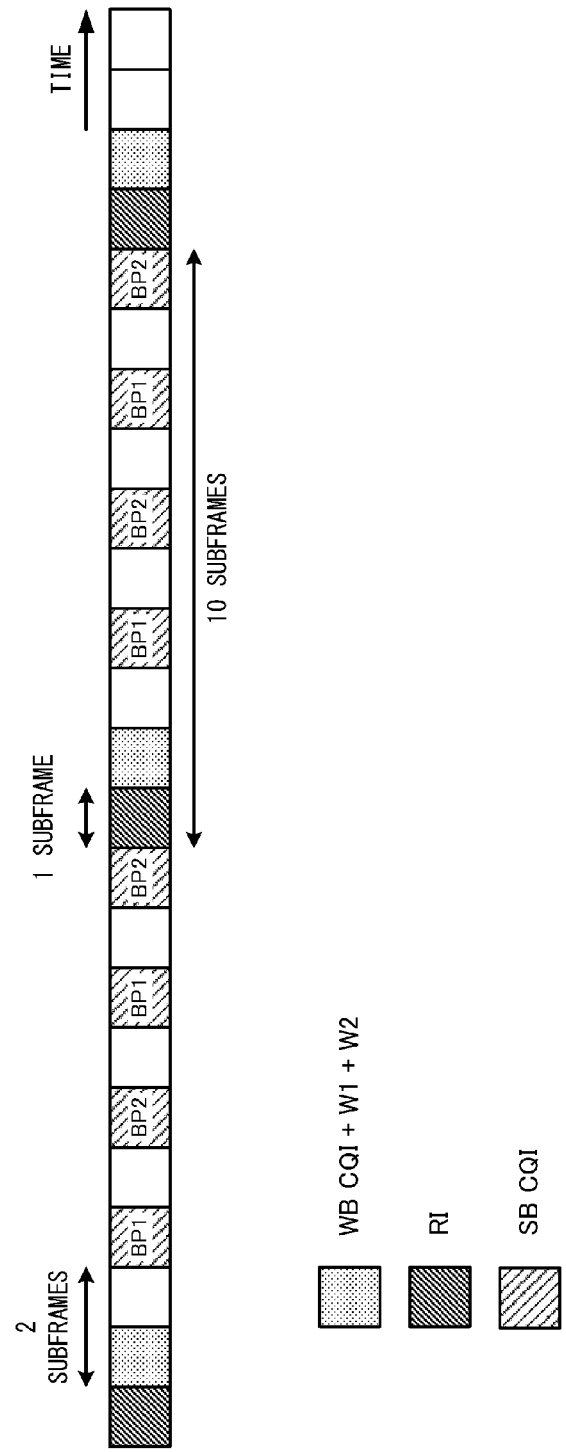

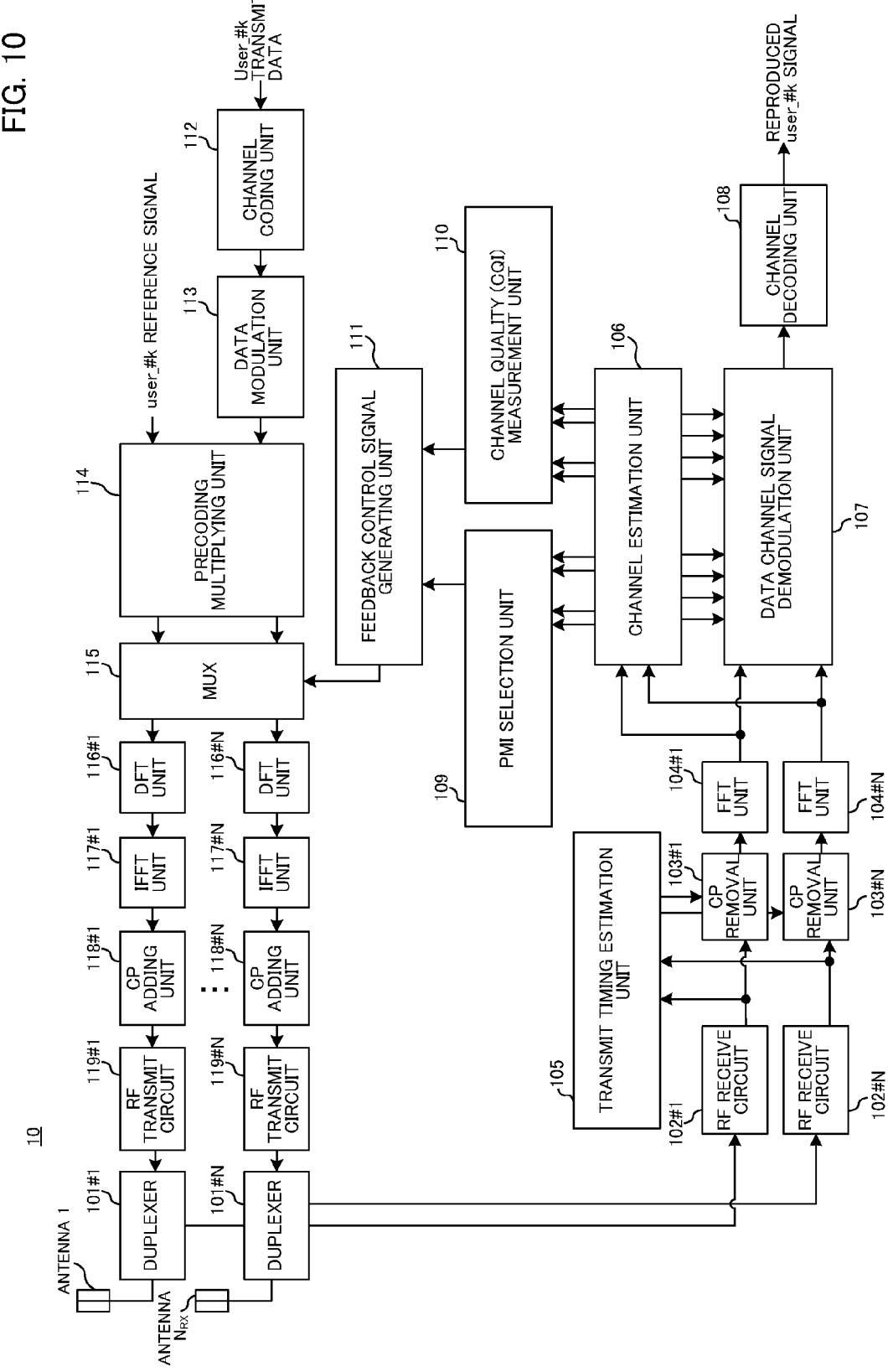

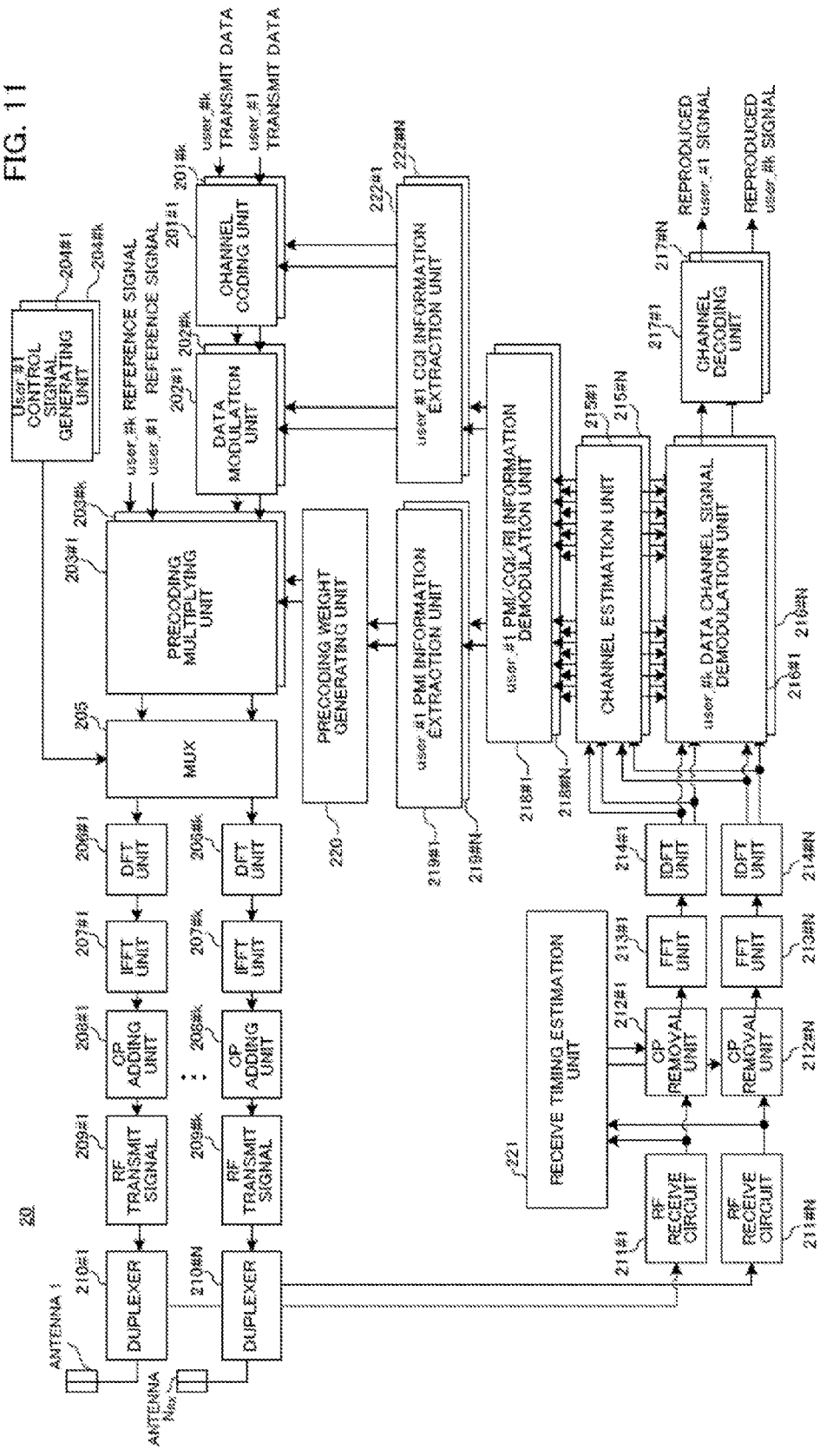

MOBILE TERMINAL DEVICE AND RADIO BASE STATION APPARATUS

TECHNICAL FIELD

The present invention relates to a mobile terminal device and a radio base station apparatus, and more particularly, to a mobile terminal device and a radio base station apparatus employed in multiple antenna transmission.

BACKGROUND ART

In a universal mobile telecommunications system (UMTS) network, high speed downlink packet access (HSDPA) or high speed uplink packet access (HSUPA) is employed in order to improve spectrum efficiency and a data rate so that characteristics of a wideband code division multiple access (W-CDMA) based system can be maximized. In such an UMTS network technology, long term evolution (LTE) has been discussed to obtain a higher data rate, a lower delay, and the like.

In a 3GPP system, a fixed band of 5 MHz is used in general to implement a transmission rate of 2 Mbps at maximum in downlink. Meanwhile, in an LTE system, transmission rates of 300 Mbps in downlink and 75 Mbps in uplink at maximum can be implemented using variable bandwidth between 1.4 MHz and 20 MHz. In addition, in a UMTS network, in order to obtain a wider bandwidth and a faster transmission rate, a post-LTE system is also discussed (e.g., LTE-Advanced (LTE-A)). For example, in LTE-A, it is anticipated that the maximum system bandwidth of 20 MHz in the LTE specification is expanded to, approximately, 100 MHz. In addition, it is anticipated that the maximum number of transmit antennas set to 4 in the LTE specification is expanded to 8.

In an LTE system, data are transmitted/received using a plurality of antennas, and a multiple input multiple output (MIMO) system has been proposed as a radio communication technique for improving a data rate (spectrum efficiency) (see e.g., Non-patent Literature 1). In the MIMO system, a plurality of transmit/receive antennas are provided in a transceiver, and different transmission information sequences are simultaneously transmitted from different transmit antennas. Meanwhile, at the receiver side, the information sequences transmitted simultaneously are separately detected in consideration of a fact that different fading variations are generated between transmit/receive antennas, so that it is possible to increase a data rate (spectrum efficiency).

In an LTE system, there are defined single-user MIMO (SU-MIMO) in which overall transmission information sequences simultaneously transmitted from different transmit antennas belong to the same user and multiple-user MIMO (MU-MIMO) in which transmission information sequences simultaneously transmitted from different transmit antennas belong to different users. In both the SU-MIMO transmission and the MU-MIMO transmission, an optimal precoding matrix indicator (PMI) is selected from a codebook in which a plurality of phase/amplitude control amounts (precoding matrix (precoding weight)) to be set for the antennas of the transmitter at the receiver side and a plurality of PMIs corresponding to the precoding matrix are defined for each rank, and the optimal PMI is fed back to the transmitter. In addition, a rank indicator (RI) indicating the optimal rank is selected and fed back to the transmitter. At the transmitter side, the precoding weights for each transmit antenna are specified based on the PMI and the RI fed back from the receiver, and the precoding is performed, so that the transmission information sequences are transmitted.

CITATION LIST

Non-Patent Literatures

[Non-patent Literature 1] 3GPP TR 25.913 "Requirements for Evolved UTRA and Evolved UTRAN"

In LTE-A, it is determined that the mobile terminal device feeds back the PMI, and the precoder selected by the mobile terminal device is generated by selecting one of double codebooks W1 and W2. It is necessary to investigate how to feed back the precoder selected from the two codebooks W1 and W2.

SUMMARY OF THE INVENTION

Technical Problem

The present invention has been made in view of the aforementioned problems, and an aim thereof is to provide a mobile terminal device and a radio base station apparatus capable of effectively feeding back PMI by selecting the precoder using double codebooks W1 and W2 in downlink MIMO transmission.

Solution To Problem

According to an aspect of the present invention, there is provided a mobile terminal device including: feedback control signal generating section that individually performs channel coding for a first precoding matrix indicator (PMI) selected from a first codebook for wideband/long-period and a second PMI selected from a second codebook for subband/short-period; and a transmit section that transmits the individually channel-coded first and second PMIs to a radio base station apparatus on a physical uplink shared channel (PUSCH).

According to an aspect of the present invention, there is provided a mobile terminal device including: a PMI selection section that selects the first PMI from a first codebook for wideband/long-period and selects the second PMI from a second codebook for subband/short-period in which a subband size is set to a relatively wider bandwidth; a multiplexing section that allocates the first and second PMIs to subframes; and a transmit section that transmits the first and second PMIs to the radio base station apparatus on a physical uplink control channel.

According to another aspect of the present invention, there is provided a radio base station apparatus including: a control signal generating section that individually generates a first trigger signal for a first PMI selected from a first codebook for wideband/long-period and a second trigger signal for a second PMI selected from a second codebook for subband/short-period; and a transmit section that transmits the individually generated first and second trigger signals to a mobile terminal device on an uplink grant.

Technical Advantage of the Invention

According to the present invention, the first PMI selected from the first codebook for wideband/long-period and the second PMI selected from the second codebook for subband/short-period are individually channel-coded, and the individually channel-coded first and second PMIs are transmitted to the radio base station apparatus on a physical uplink shared channel (PUSCH). Therefore, it is possible to effectively feed back the PMI by selecting a precoder using double codebooks W1 and W2 in downlink MIMO transmission.

BRIEF DESCRIPTION OF THE DRAWINGS

FIGS. 3A and 3B are diagrams illustrating a PMI/CQI/RI feedback using PUCCH;

FIGS. 7A and 7B are diagrams illustrating the mobile terminal device according to a third aspect of the present invention;

FIG. 10 is a block diagram illustrating a configuration of the mobile terminal device according to the embodiment described above; and FIG. 11 is a block diagram illustrating a configuration of the radio base station apparatus according to the embodiment described above.

DESCRIPTION OF EMBODIMENTS

Figure 1:
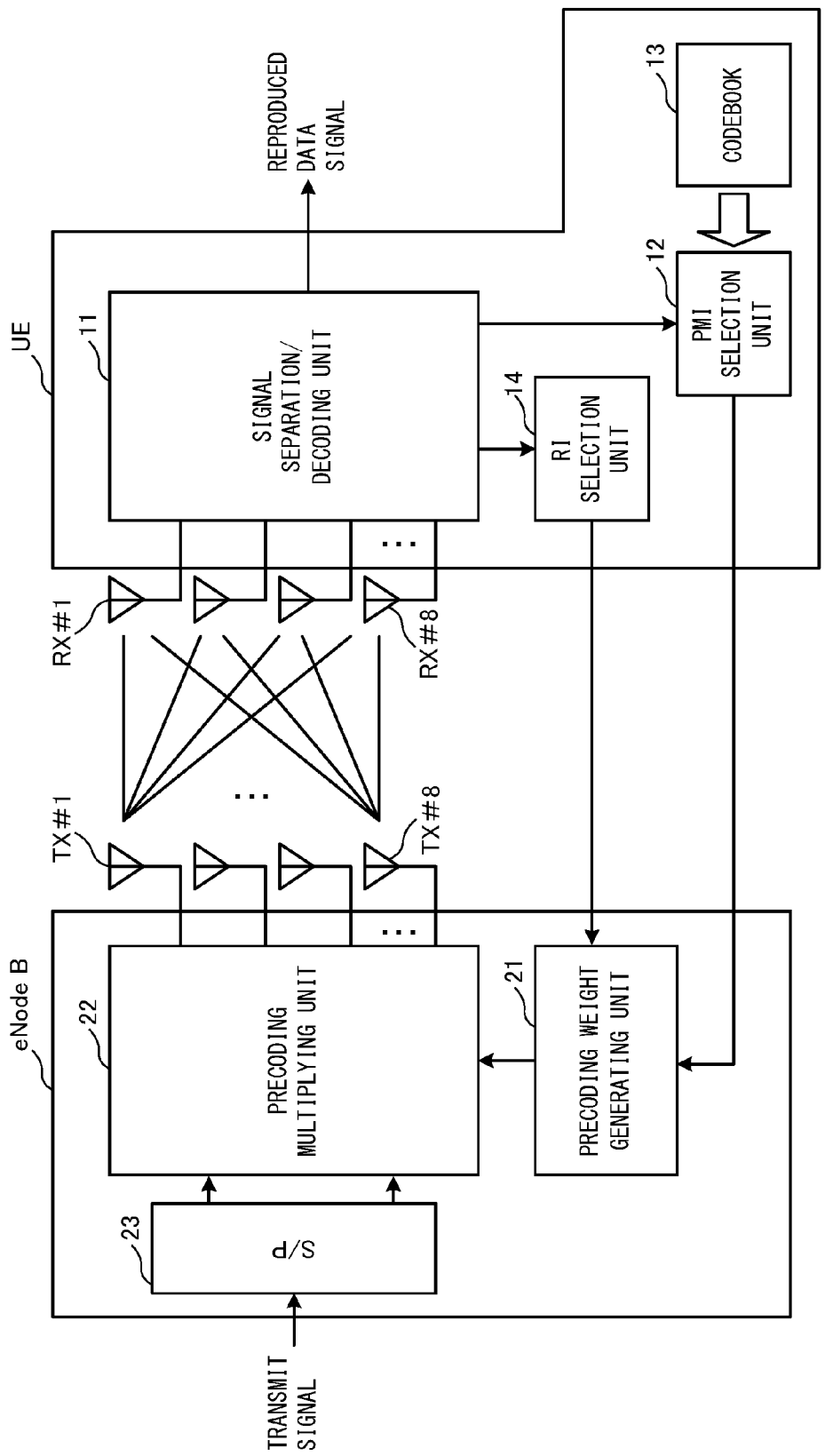
FIG. 1 is a conceptual diagram illustrating a MIMO system applied to a communication control method according to the present invention.

Hereinafter, embodiments of the present invention will be described in detail with reference to the accompanying drawings. First, a precoding in downlink MIMO transmission performed in an LTE-A system will be described based on the MIMO system of FIG. 1. FIG. 1 is a conceptual diagram illustrating a MIMO system applied to the communication control method according to the present invention. In addition, in the MIMO system of FIG. 1, each of the base station apparatus eNodeB and the user equipment UE has eight antennas.

In the precoding on downlink MIMO transmission in the MIMO system of FIG. 1, the mobile terminal device UE measures a channel variation amount using the receive signals from each antenna and selects a precoding matrix indicator (PMI) and a rank indicator (RI) corresponding to the phase/amplitude control amount (precoding weight) exhibiting a maximum throughput (or maximum receive signal to interference and noise ratio (SINR)) after combining the transmit data from each transmit antenna of the radio base station apparatus eNodeB base on the measured channel variation amount. In addition, the selected PMI and RI are fed back to the radio base station apparatus eNodeB along with the channel quality indicator (CQI) in uplink. The radio base station apparatus eNodeB performs precoding for the transmit data based on the PMI and the RI fed back from the mobile terminal device UE and transmits information from each antenna.

In the mobile terminal device UE of FIG. 1, a signal separation/decoding unit 11 separates and decodes the control channel signal and the data channel signal contained in the receive signal received through the receive antennas RX#1 to RX#8. As the signal separation/decoding unit 11 performs the decoding process, the data channel signal for the mobile terminal device UE is reproduced. The PMI selection unit 12 selects the PMI depending on the channel condition estimated by a channel estimation unit (not illustrated). In this case, the PMI selection unit 12 selects an optimal PMI from the codebook 13 including a plurality of N existing precoding weights defined for each rank in both the mobile terminal device UE and the radio base station apparatus eNodeB and the PMI corresponding to the precoding matrix. The RI selection unit 14 selects the RI depending on the channel condition estimated by the channel estimation unit. The PMI and the RI are transmitted to the radio base station apparatus eNodeB along with the channel quality indicator (CQI) as feedback information.

Meanwhile, in the radio base station apparatus eNodeB of FIG. 1, the precoding weight generating unit 21 generates the precoding weight based on the PMI and the RI fed back from the mobile terminal device UE. The precoding multiplying unit 22 controls (shifts) the phase/amplitude for each transmit antenna TX#1 to TX#8 by multiplying the precoding weight by the transmit signal converted in parallel by the serial/parallel conversion unit (S/P) 23. As a result, the phase/amplitude-shifted transmit data are transmitted from eight transmit antennas TX#1 to TX#8.

Figure 2A:
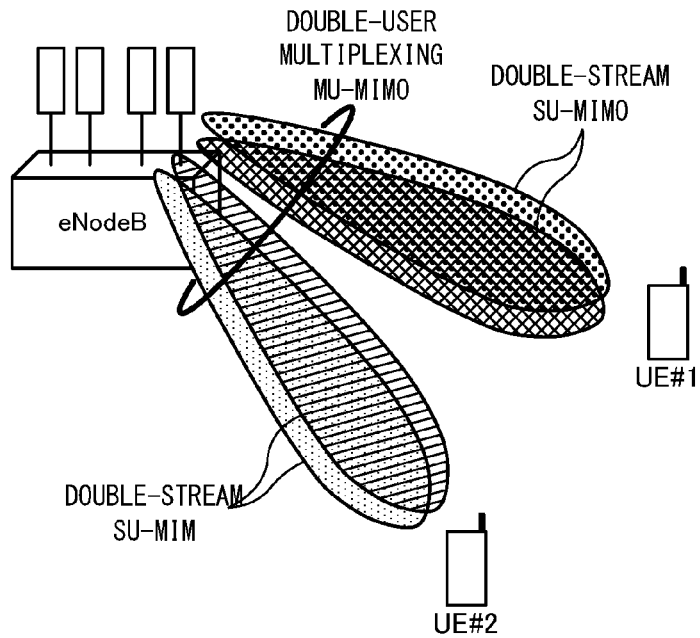
FIGS. 2A and 2B are diagrams illustrating downlink MIMO transmission in LTE-A.
Figure 2B:
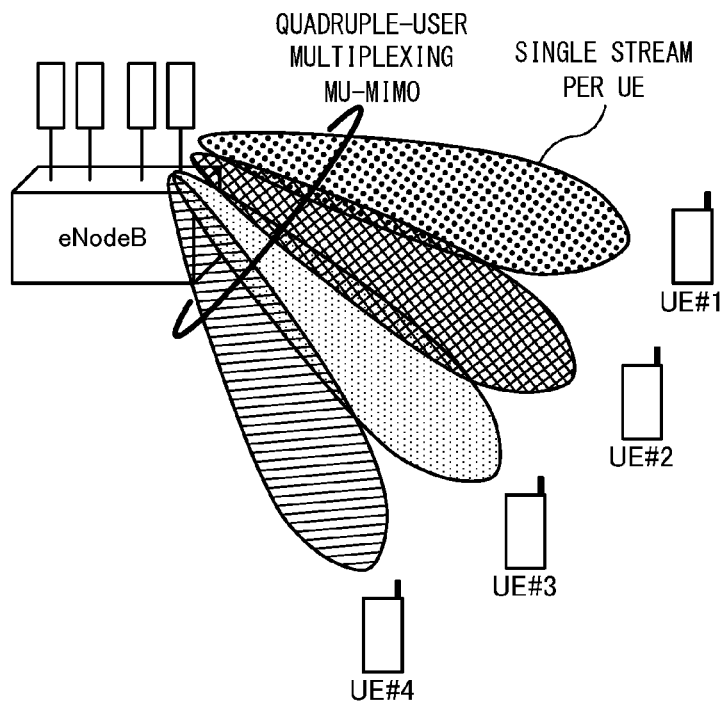

However, according to agreement of the LTE-A system, the upper limit of the number of overall streams (ranks) is set to 4, the maximum number of multiplexed streams per user equipment UE is set to 2, and the maximum number of multiplexed user equipments UE is set to 4 in downlink MU-MIMO transmission. For this reason, in the downlink MU-MIMO, there may be a case where two SU-MIMO streams are transmitted to each of the mobile terminal devices UE#1 and UE#2 as illustrated in FIG. 2A or a case where a single stream is transmitted to each of the mobile terminal devices UE#1, UE#2, UE#3, and UE#4 as illustrated in FIG. 2B.

Here, description will be made for a feedback method of feedback information including channel information (PMI/CQI/RI) from the mobile terminal device to the radio base station apparatus eNodeB in such downlink MIMO transmission. FIGS. 3A and 3B are diagrams illustrating a feedback method of feedback information from the mobile terminal device UE to the radio base station apparatus eNodeB using physical uplink control channel (PUCCH) in downlink MIMO transmission. FIGS. 3A and 3B illustrate a case where the feedback information is fed back periodically (hereinafter, referred to as periodic feedback).

In the periodic feedback, there are a mode in which wide-band (WB) CQI, WBPMI, and RI are fed back using separate subframes as illustrated in FIG. 3A and a mode in which WBCQI, WBPMI, RI, and subband (SB) CQI are fed back using separate subframes as illustrated in FIG. 3B.

In the mode illustrated in FIG. 3A, the feedback information (such as PMI/CQI and RI) is fed back using PUCCH. As illustrated in FIG. 3A, WBPMI, WBCQI, and RI are fed back using different subframes (or different transmission time intervals (TTI)). In FIG. 3A, a feedback mode of the channel information of PUCCH is set to mode 1-0(1-1), and the WBPMI/WBCQI period is set to 5 subframes. In addition, the RI period is set to twice the WBPMI/WBCQI period (10 subframes), and the subframe used to feed back the RI is offset from the subframe used to feed back the PMI/CQI by 2 subframes. In this case, PMI/CQI and RI are coded and fed back independently from each other.

Similarly, in the mode illustrated in FIG. 3B, the feedback information (such as PMI/CQI and RI) is fed back using PUCCH. As illustrated in FIG. 3B, WBPMI, WBCQI, RI, and SBCQI are fed back using different subframes (TTI). In FIG. 3B, a feedback mode of the channel information of PUCCH is set to mode 1-1(2-1), and the WBPMI/WBCQI period is set to 2 subframes. In addition, the RI period is set to five times the WBPMI/WBCQI period (10 subframes), and the subframe used to feed back the RI is offset from the subframe used to feed back the WBPMI/WBCQI by 1 subframe. Furthermore, the number of subbands (bandwidth part (BP) number) is set to 2, the subframe used to feed back the subband CQI is offset from the subframe used to feed back WBPMI/WBCQI by 2 subframes, and the subband CQI of the same subband is fed back twice during the WBPMI/CQI feedback period. In this case, WBPMI/WBCQI, RI, and SBCQI are coded and fed back independently from each other.

Figure 4:
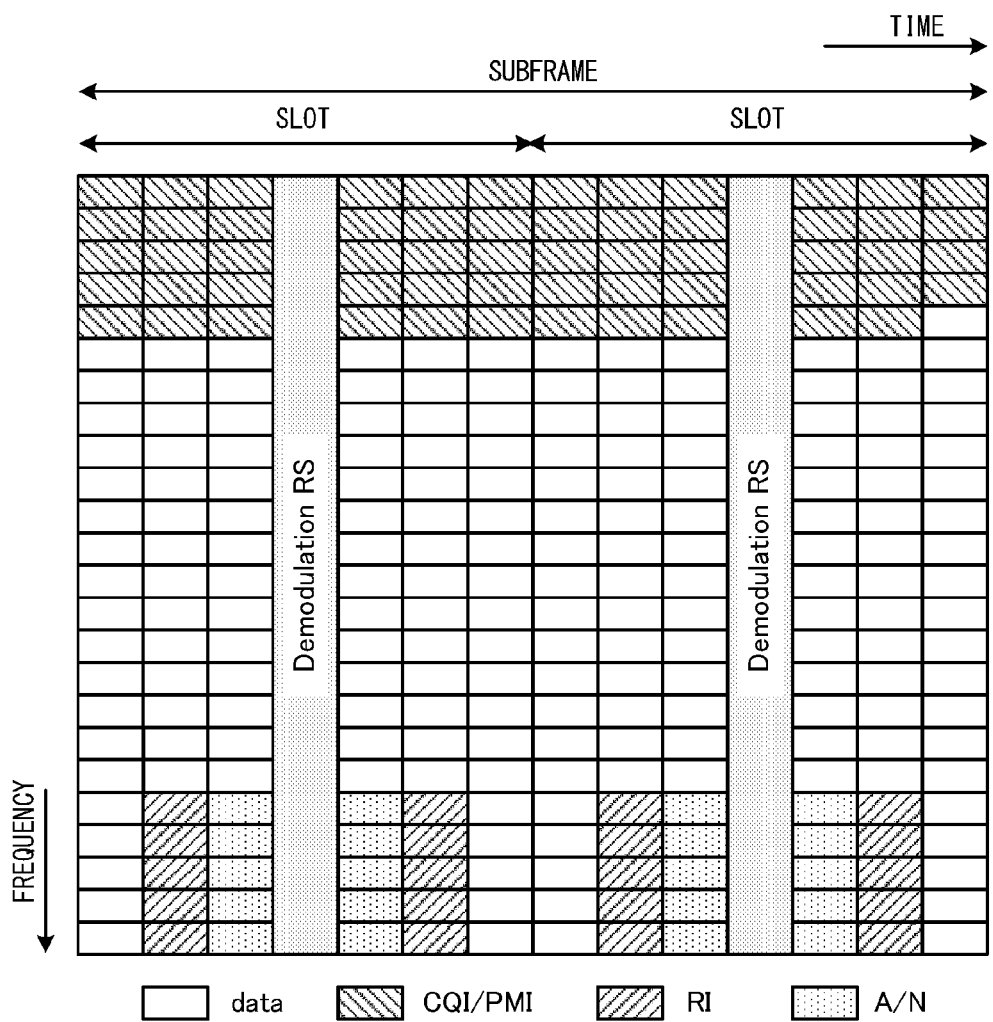
FIG. 4 is a diagram illustrating a PMI/CQI/RI feedback using PUSCH.

FIG. 4 illustrates a case where the feedback information is fed back aperiodically (hereinafter, referred to as "aperiodic feedback"). In the aperiodic feedback, the feedback information (such as PMI/CQI and RI) is fed back using the physical uplink shared channel (PUSCH) in response to an uplink-granted trigger signal coming from the base station apparatus eNodeB. As illustrated in FIG. 4, PMI/CQI and RI are fed back using different resource elements (RE) within the same subframe (TTI). In this case, similar to the periodic feedback, PMI/CQI and RI are coded and fed back independently from each other.

The PMI/CQI and the RI are coded independently from each other because the RI requires a receive quality higher than that of the PMI/CQI. That is, the RI is used to determine the number of streams at the time of MIMO transmission and requires a receive quality higher than that of the PMI/CQI used to determine the modulation and coding scheme (MCS) or the precoding weight. For this reason, the RI is coded at a coding rate lower than that of the PMI/CQI.

In the MIMO system of the LTE-A scheme, a method has been discussed, in which two codebooks (hereinafter appropriately referred to as double codebooks) are provided in both the mobile terminal device UE and the radio base station apparatus eNodeB, and feedback information is fed back for a different period, as a technique for reducing a quantization error in the quantization process of the mobile terminal device UE at the time of MU-MIMO transmission and reducing a feedback information amount for the radio base station apparatus eNodeB.

In this double codebook MIMO system, one of the codebooks is used as a wideband/long-period codebook, and the other codebook is used as a subband/short-period codebook. In this MIMO system, due to the double codebooks, it is possible to increase an effective size of the codebook. Therefore, it is anticipated that the quantization error in the quantization process of the mobile terminal device UE is reduced. In addition, the wideband/long-period codebook is not required to feed back the feedback information frequently, compared to the subband/short-period codebook. Therefore, it is anticipated that the feedback information is reduced.

Each of the first PMI selected from the codebook W1 and the second PMI selected from the codebook W2 is fed back from the mobile terminal device to the radio base station apparatus. In the radio base station apparatus, a precoder such as a precoder corresponding to the first PMI and a precoder corresponding to the second PMI is generated, and downlink MIMO transmission is performed using this precoder. In this case, the precoder for downlink MIMO transmission may be obtained through a Kronecker product between the precoder corresponding to the first PMI and the precoder corresponding to the second PMI.

The inventors achieved the invention described below by making a diligent investigation on how to feed back the precoder selected from the double codebooks in a case where double codebooks are used for the downlink MIMO transmission in this manner.

First Aspect

In this aspect, the precoder (first and second PMIs) selected from the double codebooks W1 and W2 is fed back on PUSCH. In this aspect, the first PMI selected from the first codebook for wideband/long-period and the second PMI selected from the second codebook for subband/short-period are individually channel-coded, and the individually channel-coded first and second PMIs are transmitted to the radio base station apparatus on PUSCH.

Figure 5:
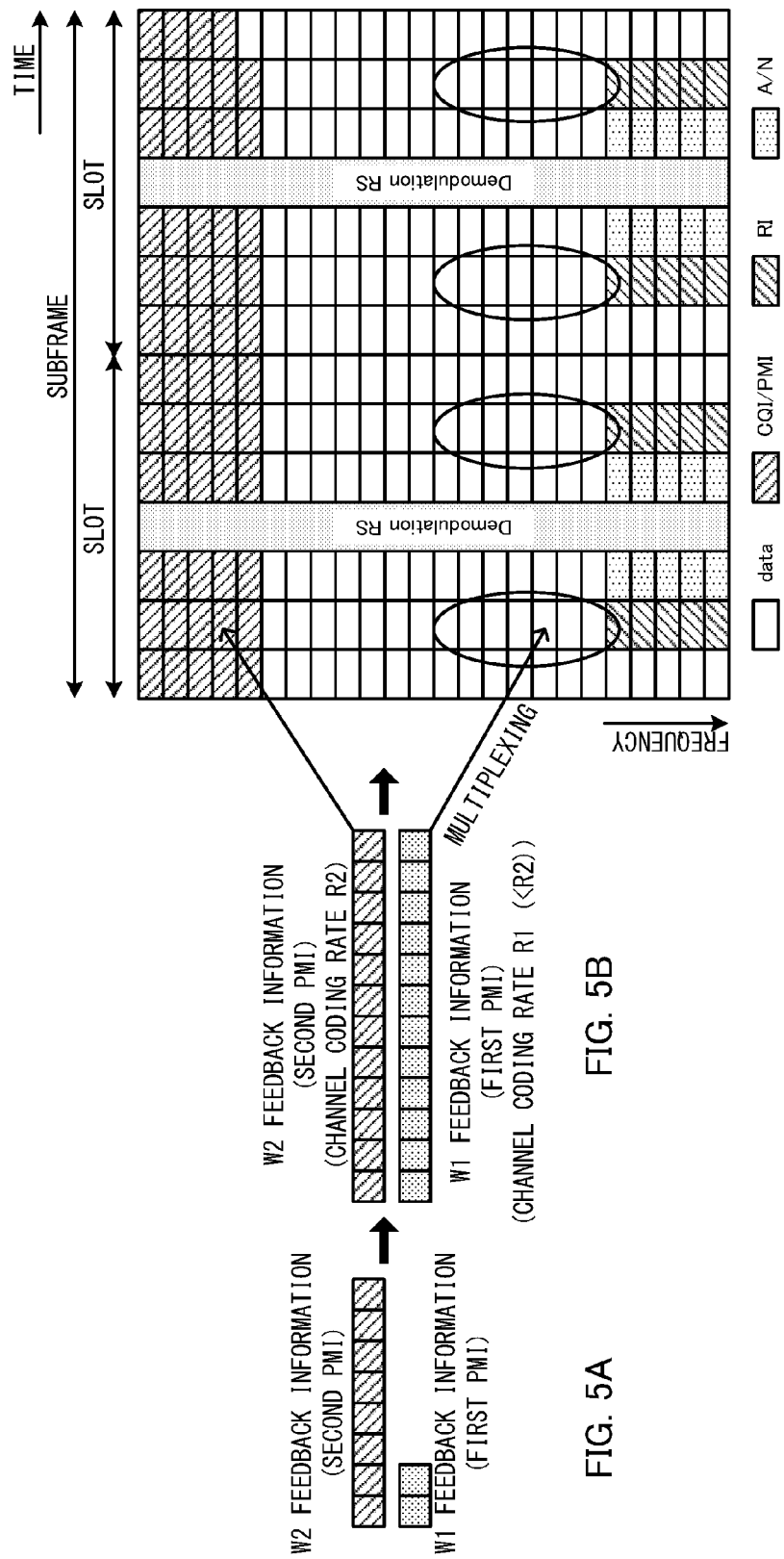
FIGS. 5A, 5B, and 5C are diagrams illustrating the mobile terminal device according to a first aspect of the present invention.

In this case, it is preferable that the first PMI be channel-coded at a channel coding rate lower than that of the second PMI (FIG. 5B). Since the first PMI is selected from the first codebook for long-period, if the first PMI is erroneous, it is conceived that the erroneous state (error propagation) is maintained until the next first PMI is fed back (for a relatively long time). In this regard, an error in the first PMI is suppressed by channel-coding the first PMI at a channel coding rate lower than that of the second PMI, so that it is possible to prevent the first PMI from having an erroneous state for a long time.

In addition, in a case where an antenna correlation is low as in the SU-MIMO, it is preferable that the second PMI be channel-coded at a channel coding rate lower than that of the first PMI. In SU-MIMO transmission, since the second PMI selected from the codebook W2 for subband/short-period is used, it is preferable that the second PMI be channel-coded at a low channel coding rate so as to prevent an error.

In addition, it is preferable that the channel coding rates of the first and second PMIs be determined based on the RI. Since the RI is determined based on a spatial correlation, it is possible to optimize the feedback-amount/codebook for each rank depending on the spatial correlation by determining the channel coding rate based on the RI. For example, in the case of a low rank, the spatial correlation is high, so that the channel coding rate of the PMI (particularly, first PMI) is lowered.

The first and second PMIs subjected to the channel coding are allocated to different positions in the resource block allocated to a user as illustrated in FIG. 5C. For example, the first PMI is allocated to the vicinity of the RI, and the second PMI is allocated to the vicinity of the CQI. That is, since the first PMI has a long period, it is necessary to perform the feedback with high performance. For this reason, it is preferable that the first PMI be allocated to the vicinity of the reference signal (demodulation reference signal (DMRS)), that is, the vicinity of RI or ACK/NACK. Meanwhile, as illustrated in FIG. 5C, the second PMI is allocated to the vicinity of CQI.

In a case where the first and second PMIs are channel-coded, the first PMI and the CQI (SBCQI or WBCQI) may be joint-coded, or the second PMI and the CQI (SBCQI or WBCQI) may be joint-coded as illustrated in FIG. 5A. In addition, the first PMI and the CQI corresponding to the first PMI may be joint-coded, or the second PMI and the CQI corresponding to the second PMI may be joint-coded. In addition, the first PMI and the RI may be joint-coded.

Second Aspect

In this aspect, when information (PMI) of the double codebooks W1 and W2 is fed back aperiodically on PUSCH using the trigger signal, the trigger signal used to feed back the information of the codebook W1 and the trigger signal used to feed back the information of the codebook W2 are individually defined.

Figure 6:
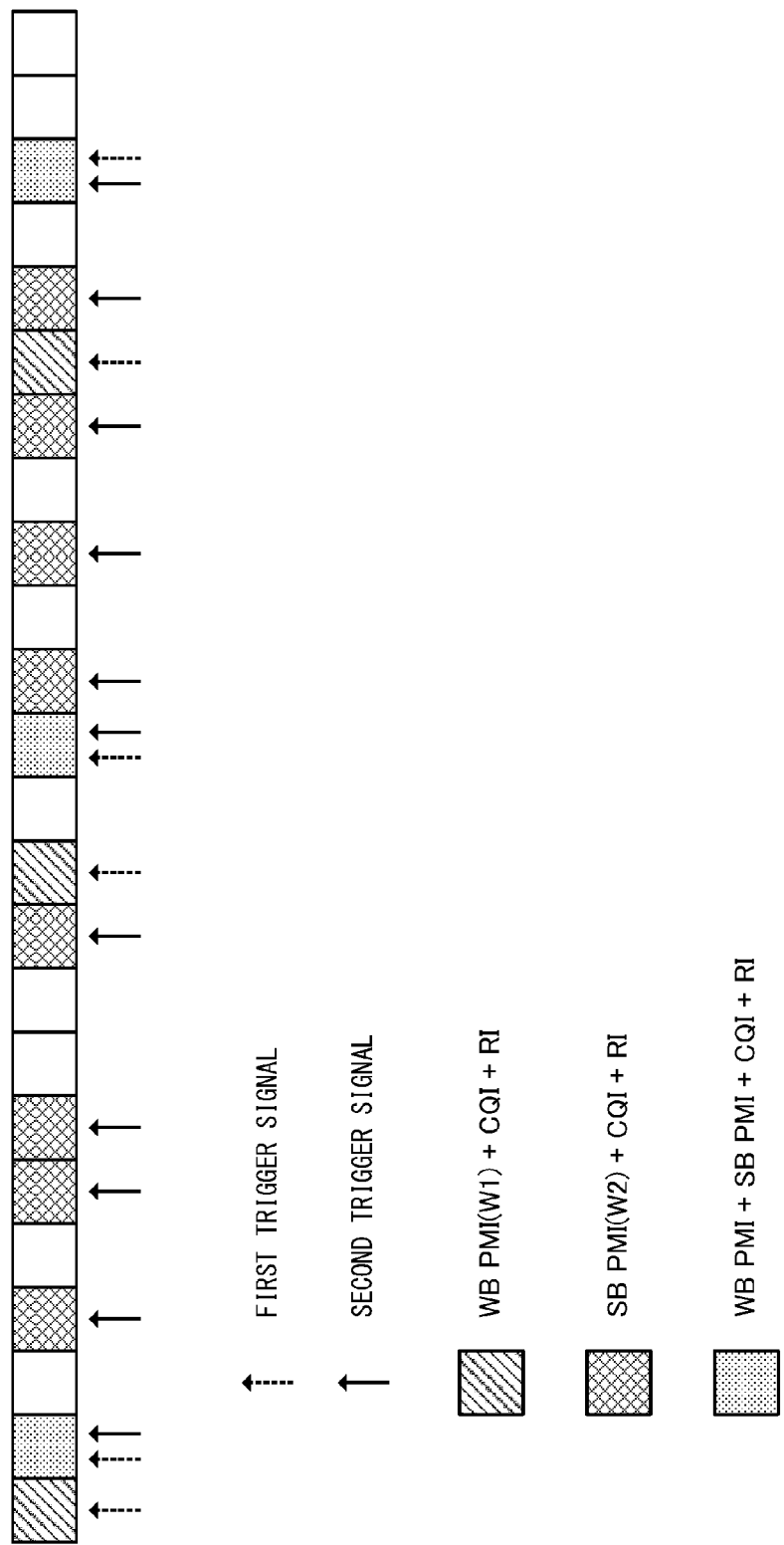
FIG. 6 is a diagram illustrating the mobile terminal device according to a second aspect of the present invention.

In this aspect, the radio base station apparatus individually generates the first trigger signal for the first PMI selected from the first codebook for wideband/long-period and the second trigger signal for the second PMI selected from the second codebook for subband/short-period, and the individually generated first and second trigger signals are transmitted to the mobile terminal device on an uplink grant as illustrated in FIG. 6.

In this manner, in the mobile terminal device which feeds back, to the radio base station apparatus, the first PMI selected from the first codebook and the second PMI selected from the second codebook based on the first and second trigger signals from the radio base station apparatus on PUSCH, the first and second PMIs are allocated to subframes, and the first and second PMIs are transmitted to the radio base station apparatus on PUSCH.

In this case, in the mobile terminal device, when two types of CQIs (SBCQI and WBCQI) are used, it is preferable that the first PMI and the CQI (SBCQI or WBCQI) corresponding to the first PMI be allocated to the same subframe, and the second PMI and the CQI (SBCQI or WBCQI) corresponding to the second PMI be allocated to the same subframe. As a result, it is possible to improve a resistance to a feedback error, that is, alleviate influence of the throughput characteristic deterioration.

In a case where the downlink MIMO transmission precoder is obtained from a product or a Kronecker product between the precoder corresponding to the first PMI and the precoder corresponding to the second PMI, it is preferable that the first PMI and the CQI corresponding to the first PMI be allocated to the same subframe, and the second PMI and the CQI corresponding to the product or Kronecker product between the first and second PMIs be allocated to the same subframe. In this case, since the second PMI is selected by assuming a particular first PMI, the CQI for the product or Kronecker product is fed back. As a result, it is possible to improve a resistance to a feedback error, that is, alleviate influence of a throughput characteristic deterioration.

In addition, in a case where the first and second PMIs are fed back using the same subframe (the first and second PMIs are allocated to the same subframe), it is preferable that the first PMI and the CQI corresponding to a product or a Kronecker product of the PMIs be allocated to subframes. As a result, it is possible to improve a resistance to a feedback error, that is, alleviate influence of a throughput characteristic deterioration.

Third Aspect

In this aspect, the precoder selected from the double codebooks W1 and W2 (first and second PMIs) is fed back on PUCCH. In this aspect, the mobile terminal device selects the first PMI from the first codebook for wideband/long-period and selects the second PMI from the second codebook for subband/short-period having a subband size set to a relatively wide bandwidth. The first and second PMIs are allocated to subframes and are transmitted to the radio base station apparatus on PUCCH.

Here, the subband size of the codebook W2 is made to be equal to the entire system band (or component carrier bandwidth). That is, the codebook is set so as to support only the wideband. In this case, as illustrated in FIG. 7A, it is preferable that the first and second PMIs and the wideband CQI be allocated to the same subframe. As a result, it is possible to suppress increase of the feedback overhead in the vicinity of the subframe to the minimum without increasing the number of feedback subframes. In addition, as illustrated in FIG. 7B, it is preferable that the second PMI and the wideband CQI be allocated to the same subframe, and the first PMI be allocated to subframes other than the aforementioned subframe. As a result, it is possible to suppress the feedback overhead in the vicinity of each subframe to the minimum.

Figure 8:
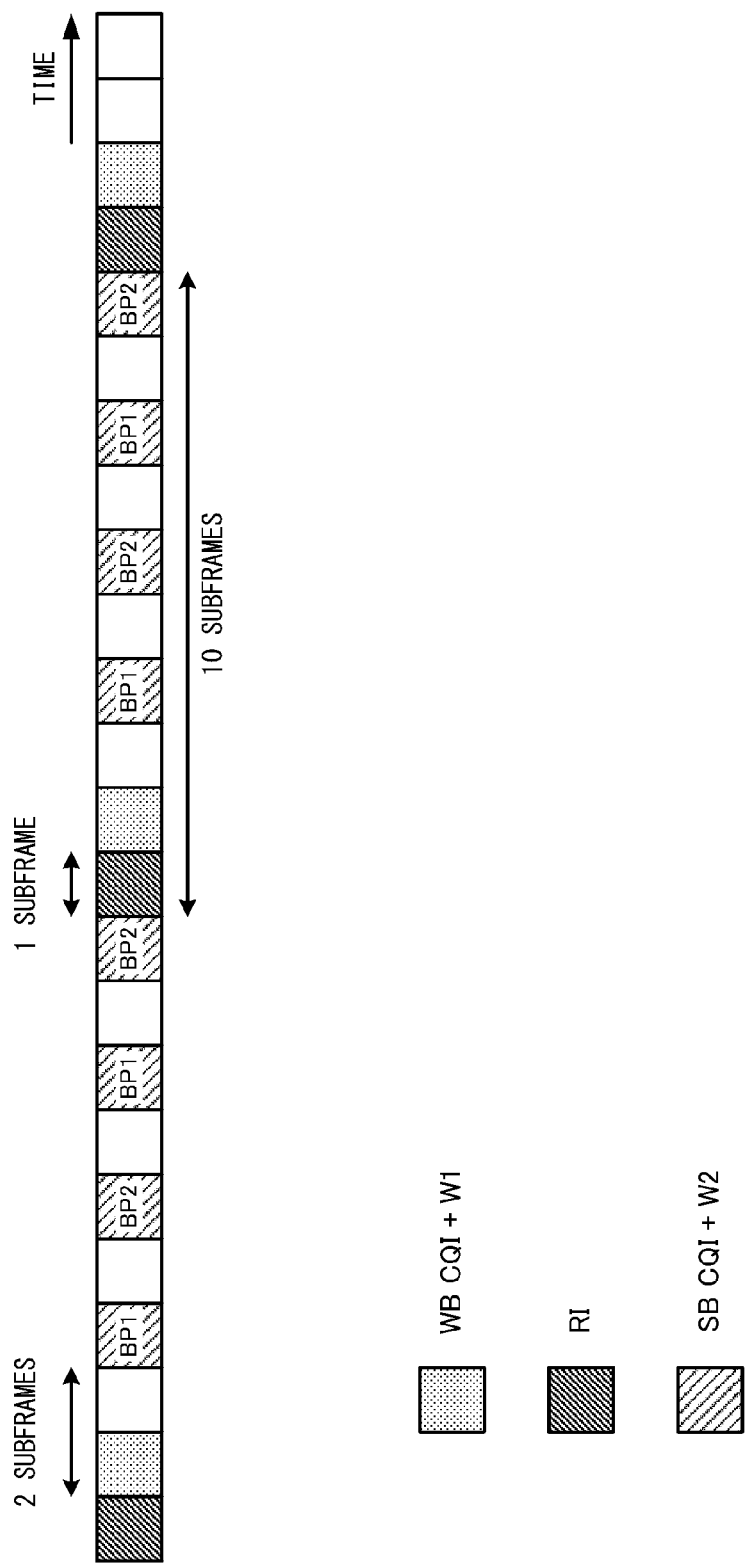
FIG. 8 is a diagram illustrating the mobile terminal device according to a third aspect of the present invention.

In the aspect in which the precoder (first and second PMIs) selected from the double codebooks W1 and W2 is fed back on PUCCH, the subband size of the codebook W2 may be equal to the subband size of the CQI. In this case, as illustrated in FIG. 8, the first PMI and the wideband CQI are allocated to the same subframe, and the second PMI and the subband CQI of the subband corresponding to the second PMI are allocated to the same subframe. As a result, it is possible to suppress increase of the feedback overhead in the vicinity of the subframe to the minimum without increasing the number of feedback subframes.

Hereinafter, embodiments of the present invention will be described in detail with reference to the accompanying drawings. Here, description will be made for a case where a radio base station apparatus and a mobile terminal device based on an LTE-A system are employed.

Figure 9:
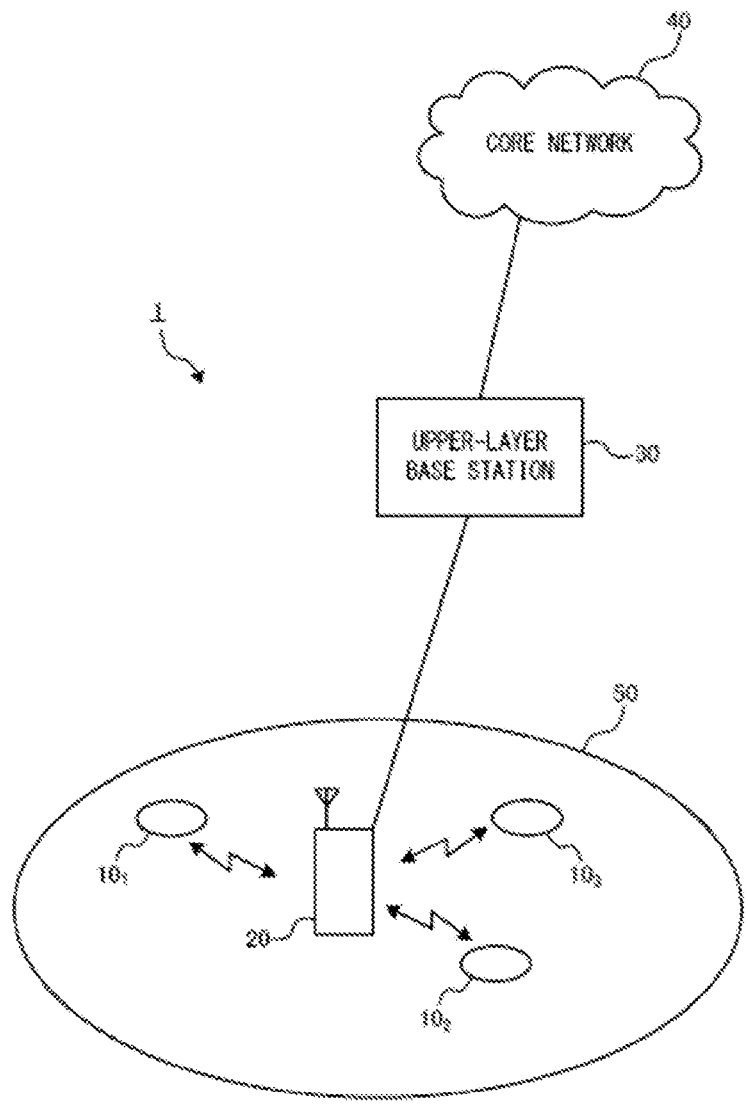
FIG. 9 is a diagram illustrating a configuration of the mobile communication system according to an embodiment of the present invention.

Referring to FIG. 9, a mobile communication system 1 having a mobile terminal device (UE) 10 and a radio base station apparatus (eNodeB) 20 according to an embodiment of the present invention will be described. FIG. 9 is a diagram illustrating a configuration of the mobile communication system 1 having the mobile terminal device 10 and the radio base station apparatus 20 according to an embodiment of the present invention. The mobile communication system 1 of FIG. 9 is, for example, an LTE system or a SUPER-3G system. In addition, the mobile communication system 1 may be called an IMT-Advanced or 4G.

As illustrated in FIG. 9, the mobile communication system 1 includes a radio base station apparatus 20 and a plurality of mobile terminal devices 10 (including $10_1, 10_2, 10_3, \ldots,$ and $10_n$, where n denotes an integer greater than 0) that communicate with the radio base station apparatus 20. The radio base station apparatus 20 is connected to an upper-layer station apparatus 30, which is connected to a core network 40. The mobile station apparatus 10 communicates with the base station apparatus 20 in a cell 50. The upper-layer station apparatus 30 may include, for example, but not limited to, an access gateway apparatus, a radio network controller (RNC), a mobility management entity (MME), and the like.

Since each mobile terminal devices $10_1, 10_2, 10_3, \ldots,$ and $10_n$ have the same configuration, function and condition, the mobile terminal device will be denoted by reference numeral 10 in the following description unless specified otherwise. For convenient description purposes, it is assumed that the mobile terminal device 10 wirelessly communicates with the radio base station apparatus 20. However, more generally, the mobile terminal device 10 may be called a user equipment UE, including both a mobile terminal device and a fixed terminal apparatus.

As a radio access scheme in the mobile communication system 1, orthogonal frequency division multiple access (OFDMA) is employed in downlink, and single carrier frequency division multiple access (SC-FDMA) is employed in uplink. In OFDMA, a multiple carrier transmission scheme is employed, in which a frequency band is divided into a plurality of narrow frequency bands (subcarriers), and communication is performed by mapping data to each subcarrier. In SC-FDMA, a single carrier transmission scheme is employed, in which interference between terminals is alleviated by dividing a system band into bands including a single or a series of resource blocks for each terminal and causing a plurality of terminals to use different bands.

Here, description will be made for a communication channel in an LTE system. In downlink, the PDSCH shared by each mobile station apparatus 10 and the downlink L1/L2 control channels (PDCCH, PCFICH, and PHICH) are used. Using this PDSCH, user data, that is, a typical data signal is transmitted. The transmit data are included in this user data. In addition, CC allocated to the mobile terminal device 10 from the radio base station apparatus 20 or scheduling information is notified to the mobile terminal device 10 through the L1/L2 control channel.

In uplink, the physical uplink shared channel (PUSCH) shared by each mobile terminal device 10 and the physical uplink control channel (PUCCH) as the uplink control channel are used. Using this PUSCH, user data are transmitted. In addition, using PUCCH, the downlink channel quality indicator (CQI) and the like are transmitted.

FIG. 10 is a block diagram illustrating a configuration of the mobile terminal device 10 according to the present embodiment. FIG. 11 is a block diagram illustrating a configuration of the radio base station apparatus 20 according to the present embodiment. The configurations of the mobile terminal device 10 and the radio base station apparatus 20 of FIGS. 10 and 11 are simplified for description of the present invention, and it is assumed that they include elements of a typical radio base station apparatus and a typical mobile terminal device, respectively.

In the mobile station apparatus 10 of FIG. 10, the transmit signal transmitted from the radio base station apparatus 20 is received by the antennas 1 to $N_{RX}$ and is electrically divided by a duplexer 101#1 to 101#N into a transmit path and a receive path. Then, they are output to the RF receive circuits 102#1 to 102#N. In addition, the RF receive circuits 102#1 to 102#N perform a frequency conversion process for converting the radio frequency signal to a baseband signal, and then, they are output to the receive timing estimation unit 105 and the CP removal units 103#1 to 103#N. The receive timing estimation unit 105 estimates a receive timing using the receive signal subjected to the frequency conversion process and outputs the receive timing to the CP removal units 103# to 103#N. The CP removal units 103#1 to 103#N remove a cyclic prefix (CP), and the fast Fourier transform (FFT) units 104#1 to 104#N perform Fourier transform to transform a time series signal to a frequency domain signal. The receive signal transformed to the frequency domain signal is output to the channel estimation unit 106 and the data channel signal demodulation unit 107.

The channel estimation unit 106 estimates the channel condition from the reference signal included in the receive signal output from the FFT units 104#1 to 104#N and notifies the data channel signal demodulation unit 107 of the estimated channel condition. The data channel signal demodulation unit 107 demodulates the data channel signal based on the notified channel condition. The demodulated data channel signal is channel-demodulated by the channel demodulation unit 108 and is reproduced by a user_#k signal.

The channel quality (CQI) measurement unit 110 measures the channel quality from the channel condition notified from the channel estimation unit 106. Specifically, the channel quality measurement unit 110 measures the CQI based on the channel condition notified from the channel estimation unit 106 and notifies the feedback control signal generating unit 111 of the CQI. The channel quality measurement unit 110 selects the first PMI selected from the first codebook W1 for wideband/long-period, the second PMI selected from the second codebook W2 for subband/short-period, or the CQI corresponding to the Kronecker product between the first and second PMIs.

The PMI selection unit 109 selects the PMI from the channel condition notified from the channel estimation unit 106.

Here, the PMI selection unit 109 has double codebooks, that is, including the first codebook for wideband/long-period and the second codebook for subband/short-period. In addition, the PMI selection unit 109 selects the first PMI from the first codebook and the second PMI from the second codebook. The PMI selection unit 109 notifies the feedback control signal generating unit 111 of the selected first and second PMIs.

In addition, the RI is selected depending on the channel condition estimated by the channel estimation unit 106, and the selected RI is notified to the feedback control signal generating unit 111.

The feedback control signal generating unit 111 serving as a control signal generating means generates a control signal (such as PUCCH signal) used to feed back the notified PMI, CQI, and RI to the base station apparatus 20. In addition, the feedback control signal generating unit 111 performs channel-coding and data-modulation of information of the PMI and the CQI of the first and second codebooks W1 and W2 for performing the feedback on PUCCH or PUSCH. This channel coding is performed according to the first aspect described above. That is, the first and second PMIs are channel-coded individually. The control signal generated by the feedback control signal generating unit 111 or the PMI or CQI subjected to the channel-coding is output to the multiplexer (MUX) 115.

Meanwhile, the transmit_data_#k for user_#k transmitted from the upper layer are channel-coded by the channel coding unit 112 and then, the coded data are modulated by the data modulation unit 113. A discrete Fourier transform unit (not illustrated) performs inverse Fourier transform for the transmit_data_#k modulated by the data modulation unit 113 to transform the time series signal to the frequency domain signal, and the transformed signal is output to the subcarrier mapping unit (not illustrated).

The subcarrier mapping unit performs mapping of the transmit_data_#k to the subcarriers based on the schedule information instructed from the radio base station apparatus 20. In this case, the subcarrier mapping unit performs mapping (multiplexing) of the reference_signal_#k generated by a reference signal generating unit (not illustrated) along with the transmit_data_#k to the subcarriers. In this manner, the transmit_data_#k mapped to the subcarriers is output to the precoding multiplying unit 114.

The precoding multiplying unit 114 shifts the phase and/or amplitude of the transmit_data_#k for each receive antenna 1 to $N_{RX}$ based on the precoding weight corresponding to the PMI. The transmit_data_#k of which the phase and/or amplitude have been shifted by the precoding multiplying unit 114 are output to the multiplexer (MUX) 115.

The multiplexer (MUX) 115 combines the transmit_data_#k of which the phase and/or phase have been shifted and the control signal generated by the feedback control signal generating unit 111 to generate transmit signals for each receive antennas 1 to $N_{RX}$. In addition, in a case where the first and second PMIs are fed back on PUSCH, the first and second PMIs and the CQI are mapped to different positions within the allocation resource. This mapping (multiplexing) is performed according to the first aspect described above. On the contrary, in a case where the first and second PMIs are fed back on PUCCH, the first and second PMIs and the CQI are allocated to subframes. This mapping (multiplexing) is performed according to the third aspect described above.

The transmit signal generated by the multiplexer (MUX) 115 is subjected to discrete Fourier transform (DFT) in discrete Fourier transform units 116#1 to 116#N to transform the time series signal to the frequency domain signal. The frequency domain signal is allocated to a frequency band orthogonal to those of other UEs through subcarrier mapping (not illustrated). Then, inverse fast Fourier transform (IFFT) units 117#1 to 117#N perform inverse fast Fourier transform to transform the frequency domain signal to the time domain signal. Then, the CP adding units 118#1 to 118#N add the CONVEX PORTION (CP) to the time domain signal and outputs the result to the RF transmit circuits 119#1 to 119#N.

The RF transmit circuits 119#1 to 119#N perform the frequency conversion process for conversion to the radio frequency band, and the radio frequency signal is output to the antennas 1 to $N_{RX}$ through the duplexers 101#1 to 101#N and is transmitted to the radio base station apparatus 20 from the antennas 1 to $N_{RX}$ in uplink. The RF transmit circuits 119#1 to 119#N, the duplexers 101#1 to 101#N, and the antennas 1 to $N_{RX}$ constitute a transmission means for transmitting the control signal.

In this manner, in the mobile station apparatus 10 according to the present embodiment, the first PMI selected from the first codebook W1 for wideband/long-period and the second PMI selected from the second codebook W2 for subband/short-period are individually channel-coded, and the individually channel-coded first and second PMIs are transmitted to the radio base station apparatus on PUSCH or PUCCH. Therefore, it is possible to effectively feed back the PMI by selecting a precoder using double codebooks W1 and W2 in downlink MIMO transmission.

Meanwhile, the radio base station apparatus 20 of FIG. 11 transmits the transmit_data_#1 to the transmit_data_#k for user_#1 to user_#k to the corresponding channel coding units 201#1 to 201#k. The transmit_data_#1 to the transmit_data_#k are channel-coded using the channel coding units 201#1 to 201#k and are output to the data modulation units 202#1 to 202#k for data modulation. The transmit_data_#1 to the transmit_data_#k subjected to the data modulation in the data modulation units 202#1 to 202#k are subjected to inverse discrete Fourier transform in the discrete Fourier transform unit (not illustrated) for conversion from the time series signal to the frequency domain signal, and the frequency domain signal is output to the precoding multiplying units 203#1 to 203#k.

The precoding multiplying units 203#1 to 203#k shift the phase and/or amplitude of the transmit_data_#1 to the transmit_data_#k for each antenna 1 to $N_{TX}$ (weighting of the antennas 1 to $N_{TX}$ through the precoding) based on the precoding weight provided from the precoding weight generating unit 220 described below. The transmit_data_#1 to the transmit_data_#k of which the phase and/or amplitude are shifted by the precoding multiplying units 203#1 to 203#k are output to the multiplexer (MUX) 205.

The control signal generating units 204#1 to 204#k generates the control signal (PDCCH) based on the number of multiplexed users from the scheduler 201. In addition, the control signal generating units 204#1 to 20444k perform feedback control of the first and second PMIs using 2 bits of the trigger signal (first and second trigger signals) within the uplink grant. That is, the control signal generating units 204#1 to 204#k individually generate the first trigger signal for the first PMI selected from the first codebook W1 for wideband/long-period and the second trigger signal for the second PMI selected from the second codebook W2 for subband/short-period. The control signal generating units 204#1 to 204#k output each PDCCH and the first and second trigger signals to the multiplexer (MUX) 205.

The multiplexer (MUX) 205 combines the transmit_data_#1 to the transmit_data_#k of which the phase and/or amplitude are shifted, each PDCCH generated by the control signal generating units 204#1 to 204#k, and the first and second trigger signals to generate transmit signals for each transmit antennas 1 to $N_{TX}$. The transmit signal generated by the multiplexer (MUX) 205 is subjected to the discrete Fourier transform in the discrete Fourier transform (DFT) units 206#1 to 206#k to transform the time series signal to the frequency domain signal. Then, the inverse fast Fourier transform (IFFT) units 207#1 to 207#k perform inverse fast Fourier transform to transform the frequency domain signal to the time domain signal. Then, the CP adding units 208#1 to 208#k add the CP, and the resultant signal is output to the RF transmit circuits 209#1 to 209#k.

After the frequency conversion process for conversion to the radio frequency band in the RF transmit circuits 209#1 to 209#N, the signal is output to the antennas 1 to $N_{TX}$ through the duplexers 210#1 to 210#N. Then, the signal is transmitted from the antennas 1 to $N_{TX}$ to the mobile terminal device 10 in downlink. The RF transmit circuits 209#1 to 209#k, the duplexers 210#1 to 210#N, and the antennas 1 to $N_{TX}$ constitute a transmit means for transmitting the control signal.

The transmit signal transmitted from the mobile terminal device 10 in uplink is received by the antennas 1 to $N_{TX}$. The received signal is electrically divided by the duplexers 210#1 to 210#N into the transmit path and the receive path, and then, the divided signals are output to the RF receive circuits 211#1 to 211#N. In addition, the RF receive circuits 211#1 to 211#N perform a frequency conversion process for converting the radio frequency signal to the baseband signal. Then, the signal is output to the receive timing estimation unit 221 and the CP removal units 212#1 o 212#N. The receive timing estimation unit 221 estimates the receive timing using the receive signal subjected to the frequency conversion process, and the receive timing is output to the CP removal units 212#1 to 212#N.

The CP is removed by the CP removal units 212#1 to 212#N, and Fourier transform is performed by the fast Fourier transform (FFT) units 213#1 to 213#N so that the time series signal is transformed to the frequency domain signal. Then, the inverse discrete Fourier transform IDFT) units 214#1 to 214#N perform the inverse discrete Fourier transform to transform the frequency domain signal to the time domain signal. The receive signal converted to the time domain signal is output to the channel estimation units 215#1 to 215#N and the data channel signal demodulation units 216#1 to 216#N.

The channel estimation units 215#1 to 215#N estimate the channel condition from the reference signal contained in the receive signal output from the IDFT units 214#1 to 214#N, and the estimated channel condition is notified to the data channel signal demodulation units 216#1 to 216#N. The data channel signal demodulation units 216#1 to 216#N demodulate the data channel signal based on the notified channel condition. The demodulated data channel signal is channel-decoded by the channel decoding units 217#1 to 217#N and is reproduced to user signals user_#1 to user_#k. The antennas 1 to $N_{TX}$, the duplexers 210#1 to 210#N, and the RF receive circuits 211#1 to 211#N constitute a receive means for receiving the control signal.

The PMI/CQI/RI information demodulation units 218#1 to 218#N demodulate information regarding channels (channel information), for example, feedback information such as CQI, PMI, and RI notified using PDCCH from the information included in each control channel signal (e.g., PUCCH). The information demodulated by the PMI/CQI/RI information demodulation units 218#1 to 218#N is output to the CQI information extraction units 222#1 to 222#N and the PMI information extraction units 219#1 to 219#N, respectively.

The CQI information extraction units 222#1 to 222#N extract the CQI information from the information demodulated by the PMI/CQI/RI information demodulation units 218#1 to 218#N. The extracted CQI is output to the data modulation units 202#1 to 202#k and the channel coding units 201#1 to 201#k, respectively.

The PMI information extraction units 219#1 to 219#N extract the PMI information from the information demodulated by the PMI/CQI/RI information demodulation units 218#1 to 218#N. Here, the PMI information refers to the first PMI selected from the first codebook W1 and the second PMI selected from the second codebook W2. The PMI-extracted first and second PMIs are output to the precoding weight generating unit 220.

The precoding weight generating unit 220 serving as a weight generating means generates the precoding weight representing the phase and/or amplitude shift amount for the transmit_data#1 to the transmit_data_#k based on the first and second PMIs output from the PMI information extraction units 219#1 to 219#N and the RI. Each of the generated precoding weights is output to the precoding multiplying units 203#1 to 203#k and is used in the precoding of the transmit_data#1 to transmit_data_#k.

In this manner, the radio base station apparatus 20 according to the present embodiment individually generates the first trigger signal for the first PMI selected from the first codebook for wideband/long-period and the second trigger signal for the second PMI selected from the second codebook for subband/short-period and transmits the individually generated first and second trigger signals to the mobile terminal device on an uplink grant. Therefore, it is possible to effectively feedback the PMI by selecting the precoder using double codebooks W1 and W2 in downlink MIMO transmission.

While the present invention has been described in detail in conjunction with the aforementioned embodiments, those skilled in the art would appreciate that the embodiments described in this specification are not intended to limit the scope of the invention. The embodiments may be modified or changed without departing from the scope or spirit of the invention, as set forth in claims. Accordingly, description of this specification is provided for just exemplification purposes and is not intended to limit the invention.

This application is based on and claims priority to Japanese Unexamined Patent Application No. 2010-104838, filed on Apr. 30, 2010, the entire content of which is incorporated herein by reference.

The invention claimed is:

1. A mobile terminal device comprising:
    a feedback control signal generator that individually performs channel coding for a first precoding matrix indicator (PMI) selected from a first codebook for wideband and a second PMI selected from a second codebook for subband; and
    a transmitter that transmits the individually channel-coded first and second PMIs to a radio base station apparatus on a physical uplink shared channel (PUSCH),
    wherein the feedback control signal generator performs, in multiple-user multiple input multiple output (MU-MIMO) transmission, channel coding for the first PMI at a channel coding rate lower than that of the second PMI, and performs, in single-user MIMO (SU-MIMO) transmission, channel coding for the second PMI at a channel coding rate lower than that of the first PMI.

2. The mobile terminal device according to claim 1, wherein the channel coding rates of the first and second PMIs are determined based on a rank indicator (RI).

3. The mobile terminal device according to claim 1, further comprising a multiplexer that allocates the first and second PMIs subjected to the channel coding to different positions of a resource block allocated to a user.

4. The mobile terminal device according to claim 3, wherein the multiplexer allocates the first PMI to a vicinity of RI and multiplexes the second PMI to a vicinity of a channel quality indicator (CQI).

5. The mobile terminal device according to claim 1, wherein the feedback control signal generator performs joint-coding between the first PMI and CQI.

6. The mobile terminal device according to claim 1, wherein the feedback control signal generator performs joint-coding between the second PMI and CQI.

7. The mobile terminal device according to claim 1, wherein the feedback control signal generator performs joint-coding between the first PMI and CQI corresponding to the first PMI and performs joint-coding between the second PMI and CQI corresponding to the second PMI.

8. The mobile terminal device according to claim 1, wherein the feedback control signal generator performs joint-coding between the first PMI and RI.

* * * * *